United States Patent
Gu et al.

(10) Patent No.: US 9,737,960 B2
(45) Date of Patent: Aug. 22, 2017

(54) LASER-BASED LAP WELDING OF SHEET METAL COMPONENTS USING LASER INDUCED PROTUBERANCES TO CONTROL GAP

(75) Inventors: Hongping Gu, Waterloo (CA); Boris Shulkin, West Bloomfield, MI (US)

(73) Assignee: Magna International Inc., Aurora (CA)

( * ) Notice: Subject to any disclaimer, the term of this patent is extended or adjusted under 35 U.S.C. 154(b) by 577 days.

(21) Appl. No.: 13/805,103

(22) PCT Filed: Jul. 4, 2011

(86) PCT No.: PCT/CA2011/000781
§ 371 (c)(1),
(2), (4) Date: Dec. 20, 2012

(87) PCT Pub. No.: WO2012/000106
PCT Pub. Date: Jan. 5, 2012

(65) Prior Publication Data
US 2013/0087540 A1 Apr. 11, 2013

Related U.S. Application Data

(60) Provisional application No. 61/360,708, filed on Jul. 1, 2010.

(51) Int. Cl.
*B23K 26/00* (2014.01)
*B23K 26/08* (2014.01)
(Continued)

(52) U.S. Cl.
CPC .......... *B23K 26/32* (2013.01); *B23K 26/0078* (2013.01); *B23K 26/322* (2013.01); *B23K 2201/34* (2013.01); *B23K 2203/50* (2015.10)

(58) Field of Classification Search
CPC .. B23K 2203/12; B23K 26/246; B23K 26/26; B23K 26/3206; B23K 26/3213; B23K 26/0078; B23K 26/3293
(Continued)

(56) References Cited

FOREIGN PATENT DOCUMENTS

| WO | 99/08829 A1 | 2/1999 |
|---|---|---|
| WO | 2008/149008 A2 | 12/2008 |

OTHER PUBLICATIONS

Choi et al., Using a Hybrid Laser Plus GMAW Process for Controlling the Beat Humping Defect, Published in Aug. 2006 under "Welding Research," pp. 174s to 179s.*
(Continued)

*Primary Examiner* — Tu B Hoang
*Assistant Examiner* — Michael Hoang
(74) *Attorney, Agent, or Firm* — Middleton Reutlinger (57) ABSTRACT

A method for laser welding first and second components is provided including moving a laser beam across a portion of a surface of the first component at a speed sufficient to generate protuberances on the surface of the first component by means of a humping effect, juxtaposing said first and second components such that opposed surfaces of the first and second components are separated by said protuberances on the surface of the first component, and laser welding said first and second components by scanning the laser beam in a region in which said surfaces are separated by said protuberances. The height of the protuberances can be controlled by controlling a scanning speed of the laser beam.

18 Claims, 9 Drawing Sheets

(51) Int. Cl.
*B23K 26/32* (2014.01)
*B23K 26/322* (2014.01)
*B23K 101/34* (2006.01)
*B23K 103/00* (2006.01)

(58) Field of Classification Search
USPC .............. 219/121.64, 121.6, 121.61, 121.63, 219/121.78, 121.8, 121.85
See application file for complete search history.

(56) References Cited

OTHER PUBLICATIONS

Kawahito, "Elucidation of high-power fibre laser welding phenomena of stainless steel and effect of factors on weld geometry." Published on Sep. 21, 2007.*

Nguyen et al. "High speed fusion weld bead defects" Science and Technology of Welding & Joining vol. 11, No. 6 Nov. 1, 2006 (Jan. 11, 2006) pp. 618-633 (16 in total) DOI: 10.1179/174329306X128464 (see section 1—'Introduction' (all), Section.

Thomy et al. "The Occurrence of Humping in Welding with Highest Beam Qualitics" Key Engineering Materials vol. 344 Jul. 2007 (Jul. 2007) pp. 731-743 DOI: 10.4028/www.scientific.net/KEM.344.731 (see 'Abstract', 'Introduction' and 'Theoretical approaches to the humping effect', along with figs. 1, 3 and 4).

International Search Report dated Oct. 4, 2011 in corresponding International Application No. PCT/CA2011/000781.

* cited by examiner

Step 3 figure 2b

LASER-BASED LAP WELDING OF SHEET METAL COMPONENTS USING LASER INDUCED PROTUBERANCES TO CONTROL GAP

FIELD OF THE INVENTION

The present invention generally relates to the field of laser welding and more particularly to the field of laser welding of metal or metal alloys having a coating with a lower vaporizing temperature than the melting point of the metal or metal alloy to be welded.

BACKGROUND OF THE INVENTION

Remote laser beam welding uses mirrors in a processing head to manipulate and guide a laser beam to a workpiece. Such a process enables a highly productive and flexible production line layout, and hence makes laser welding production more cost effective. More particularly, in the welding of auto-body components, remote laser welding greatly simplifies the process procedures. Lap and butt joints are common joining configurations in such components. Advantageously, laser beam welding technology has a low total heat input and hence causes low distortion to the components. Therefore, remote laser beam welding provides a welding technology for producing lighter and more compact auto-body structures.

The increased use of zinc or zinc alloy coated metal sheets in auto-body components for enhanced corrosion resistance creates a demand for an acceptable welding method to join these kinds of sheets. Laser beam welding has an advantage of low total heat input and thus causes a low distortion to the zinc-rich coating on the sheet. Therefore, laser beam welding is being evaluated as a desirable joining technique for such sheet steel in butt and lap joint configurations. However, a problem arises with welding these materials in the lap-joint configuration due to the low boiling point of zinc (906° C.) compared with the melting temperature of steel (~1550° C.).

If there is no joint clearance between the sheets the zinc vapor during welding can only escape through the molten welding pool, and this typically results in excessive weld porosity or complete expulsion of the weld metal. In order to make a good quality weld, there are, in principle, two solutions to get around this problem: (1) creating a zinc-vapor venting channel during welding; or (2) removing the zinc coating in the welding pass. Both of these approaches need additional techniques to be realized. Many techniques have been developed to provide a gap between sheets to perform laser welding and to remove the zinc coating at the welding spot. These approaches typically require the use of supplementary components or spacers and are difficult for maintenance in the production line, since additional equipment is required to create a gap or remove the coating. This will incur a significant expense and increase production time.

Providing a small gap between the sheets has been proven to be the most practical technique to create a zinc-vapour venting channel. However, to maintain a small gap between the sheets, especially in a production line, can be challenging.

PCT Publication WO 99/08829 discloses a method for conventional laser beam welding of a zinc-coated steel sheet in which protuberances are generated on one of the joining sheets by a laser dimpling technique. Laser dimpling has been proven to be a viable technique to generate dimples for providing a vapour venting gap at the welding location. This is a flexible pre-process which is not limited by the welding location and the shape of the components. In spite of these benefits, this preprocess still adds production cost to the welding process. In order to minimize the additional cost, the laser dimpling process needs to be carried out as fast as possible. Therefore, this dimpling technique can not be readily applied to remote laser beam welding processes due to its limited process speed.

It is desirable to provide an efficient solution or technique to generate a gap in remote laser beam welding.

SUMMARY OF THE INVENTION

An object of the present invention is to overcome the problems delineated hereinabove. In accordance with this object, the present invention provides a method for laser welding first and second components comprising the steps of moving a laser beam across a portion of a surface of the first component at a speed sufficient to generate protuberances on the surface of the first component by means of a humping effect, juxtaposing said first and second components such that opposed surfaces of the first and second components are separated by said protuberances on the surface of the first component, and laser welding said first and second components by scanning the laser beam in a region in which said surfaces are separated by said protuberances.

In accordance with another embodiment of the invention, the first and second components are made from metal or metal alloy, such as steel, and wherein at least one of the first and second components is coated with a material having a vaporizing temperature that is lower than a melting point of the metal or metal alloy. Examples of coatings having a low vaporizing temperature are zinc, zinc oxide, magnesium, and magnesium oxide, i.e. the vaporizing temperature of these coatings is lower than the melting point of the metal or metal alloy.

In accordance with yet another embodiment of the invention, the protuberances create a pattern substantially corresponding to a welding pattern generated by the laser welding step or alternatively, the protuberances create a pattern different from a welding pattern generated by the laser welding step. The laser welding step of the first and second components can be performed by scanning the laser beams in a region in which the surfaces of the first and second component are separated by the protuberances. The location of the generation of the protuberances can be off the welding location as long as an adequate gap size exists at the welding location for providing an adequate venting channel.

In accordance with a further embodiment of the invention, the laser beam is manipulated by a remote laser welding head.

In accordance with yet another embodiment, the method of the instant invention further includes the step of clamping the first and second components to each other prior to the step of laser welding.

In accordance with the invention there is further provided, a method of controlling a height of the protuberances by controlling a scanning speed of the laser beam or by controlling an intensity of the laser beam. The step of controlling the intensity of the laser beam includes controlling a laser power and a beam spot size of the laser beam.

Furthermore, the protuberances are produced when an incident angle of the laser beam can be varied to a large degree.

In accordance with another aspect of the invention, there is further provided a method for laser welding first and second components comprising the steps of moving a laser beam across a portion of a surface of the first component at a speed sufficient to generate protuberances on the surface of the first component by means of a humping effect, juxtaposing said first and second components such that opposed surfaces of the first and second components are separated by said protuberances on the surface of the first component, laser welding said first and second components by scanning the laser beam in a region in which said surfaces are separated by said protuberances, and controlling a height of the protuberances by controlling a scanning speed of the laser beam.

This and other objects of the invention can be more fully appreciated from the following detailed description of the preferred embodiments.

BRIEF DESCRIPTION OF THE DRAWINGS

Exemplary embodiments of the invention will now be described in conjunction with the following drawings wherein like numerals represent like elements, and wherein.

DETAILED DESCRIPTION OF THE PREFERRED EMBODIMENTS

In accordance with the present invention, a practical, efficient and flexible way of remote laser beam welding of coated metal or metal alloy components is provided. The metal or metal alloy components, such as steel sheets, are provided with a coating having a low vaporization temperature, such as for example magnesium, zinc, or zinc oxide coatings. A low vaporization temperature in the context of this specification means that the vaporization temperature of the coating is lower than the melting point of the metal or metal alloy components. A zinc coating, for example, is particularly advantageous for corrosion protection of steel sheets in the automotive industry.

In general terms, a remote laser beam pre-processes one of the components at a high speed to create a controllable gap between the sheets before the remote laser welding is performed. This is particularly advantageous for lap welding processes to create a venting channel for the vapours generated by the coating when the two components are joined.

More specifically, in the pre-process, a high-speed scan over a steel sheet with a laser beam of sufficient beam intensity generates a series of humps on the surface of this sheet. These humps or protuberances maintain opposed surfaces of the sheets in a spaced relationship. The height of the humps and hence the space maintained between the two components can be controlled by varying the scan speed and/or laser beam intensity according to the requirements of different material thicknesses, coatings and structures. In this manner, the welding can be completed entirely on a single welding apparatus in an efficient cost-effective way. With such a technique, the remote laser welding makes it possible to perform welding of any kind of weld shapes and flexible and varying welding locations.

In accordance with an embodiment of the invention, a method of creating a gap for vapour gas venting is disclosed when a remote laser beam scans the surface of one of the components at a high speed in a pre-processing step before the actual laser welding step is performed. The principle is that a humping effect takes place when a high-intensity laser beam scans over a metal surface at a high speed. The humping effect forms a series of metal droplets or protuberances above the laser produced bead. The protuberance height above the surface can be up to a few tenths millimeters and can be varied or controlled via the scan speed and laser beam intensity. This series of protuberances in a line or curve or in few locations serve as a spacer to create venting channels. When the laser beam pre-processed sheet component is stacked together with another sheet component, a gap is formed. The gap is provided at or near the area where the two components are to be joined by laser welding. Thus, laser beam welding can be performed in the area where the two components are spaced apart by the protuberances generated by the humping effect and good quality welds can be obtained with this technique.

With the advancement of laser technologies, high power and high beam quality lasers are readily available and are becoming increasingly cost-effective to many industrial applications. Remote laser beam welding is one of the laser applications that take advantage of the fibre-delivery laser technology. A high-quality laser beam has a low divergence angle so that it has a better focusing ability and can be delivered through a fibre of small core diameter. Therefore, the laser beam can be focused on a workpiece or component at a large distance from a processing head and still maintains a typical small focus spot for deep penetration welding.

A remote welding head uses a pair of scanning mirrors to guide or direct the laser beam to the workpiece. The beam movement is highly dynamic and thus extremely high speed can be achieved for repositioning the beam from one weld to another without compromising its accuracy in position. In addition, the coordinated motion between the axes allows for a laser beam to generate many patterns, such as lines, circles and brackets, etc. Therefore, remote laser welding is well suited for multiple-location welding of lap joint in a large 2D or 3D working envelope.

Laser beam lap welding of zinc coated steel sheet, however, is not a straightforward process. If no measures are taken, the vaporization of the coating material between the joining interfaces will propel the weld metal out of the joint, resulting in a poor weld. Many techniques have been developed to solve this problem. The main approach of these successful techniques is to vent the coating vapour out of the weld pool. The venting channel can be the modified keyhole in a typical dual-beam welding or a small gap between the joining surfaces.

A common effective gap for venting vapour is between 0.1 to 0.2 mm depending on the thickness of the sheet material and the coatings. To create such a small gap consistently in the production environment can be challenging. For structural components, small dimples can be built into the forming die. Depending on the complexity of the component's shape, however, the dimples on the die may interfere with the material flow in the forming operation. Furthermore, the wear-out of the mechanical dimples is another issue for maintaining the consistency of the dimple's height.

The humping effect in laser beam welding is a phenomenon of melt pool instability that starts if a certain welding speed is exceeded for a given configuration of material, laser beam power and beam spot size. It is characterized by the formation of periodic droplets on the weld bead surface. Thus, the humping effect sets the limit for the processing speed for a given laser beam intensity. For $CO_2$ laser beam welding, such adverse effect can be observed at a welding speed as low as 10 m/min.

For fiber-delivery lasers, the speed limit for humping effects tends to be higher. However, with increasing laser power and improvements in beam quality, the humping limit can be decreased to a welding speed of 10 m/min. Various research projects have been conducted to find the speed limit of humping effect on the processing parameters, aiming to push forward the humping limit to a higher welding speed at a given laser beam power.

Although humping is an unwanted effect for laser beam welding, it can be advantageously used in accordance with the instant invention as a pre-process for laser beam welding of coated metal or metal alloy components, particularly in a lap joint configuration, in which a small gap is desired between the joining surfaces. The humps or droplets on the weld seam have an adequate height to provide a proper gap for lap welding.

By utilizing the humping effect, laser beam lap welding of coated metal or metal alloy components requires a two-step process. The first step is a pre-process in which a laser beam generates a series of humps along or near the welding locations on one of the joining components. After the humps are formed, another component is placed on top of it and this pair of components is then clamped together. The second step is the actual welding process in which the laser beam produces the desired weld patterns at the designated locations.

Figure 1:
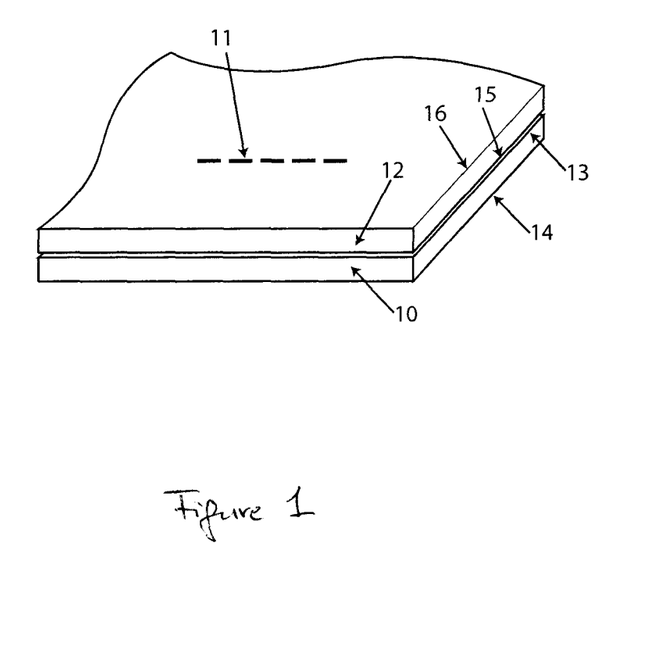
FIG. 1 shows a plan view of a portion of a lap joint of laser lap welded components in accordance with the invention.
Figure 2A:
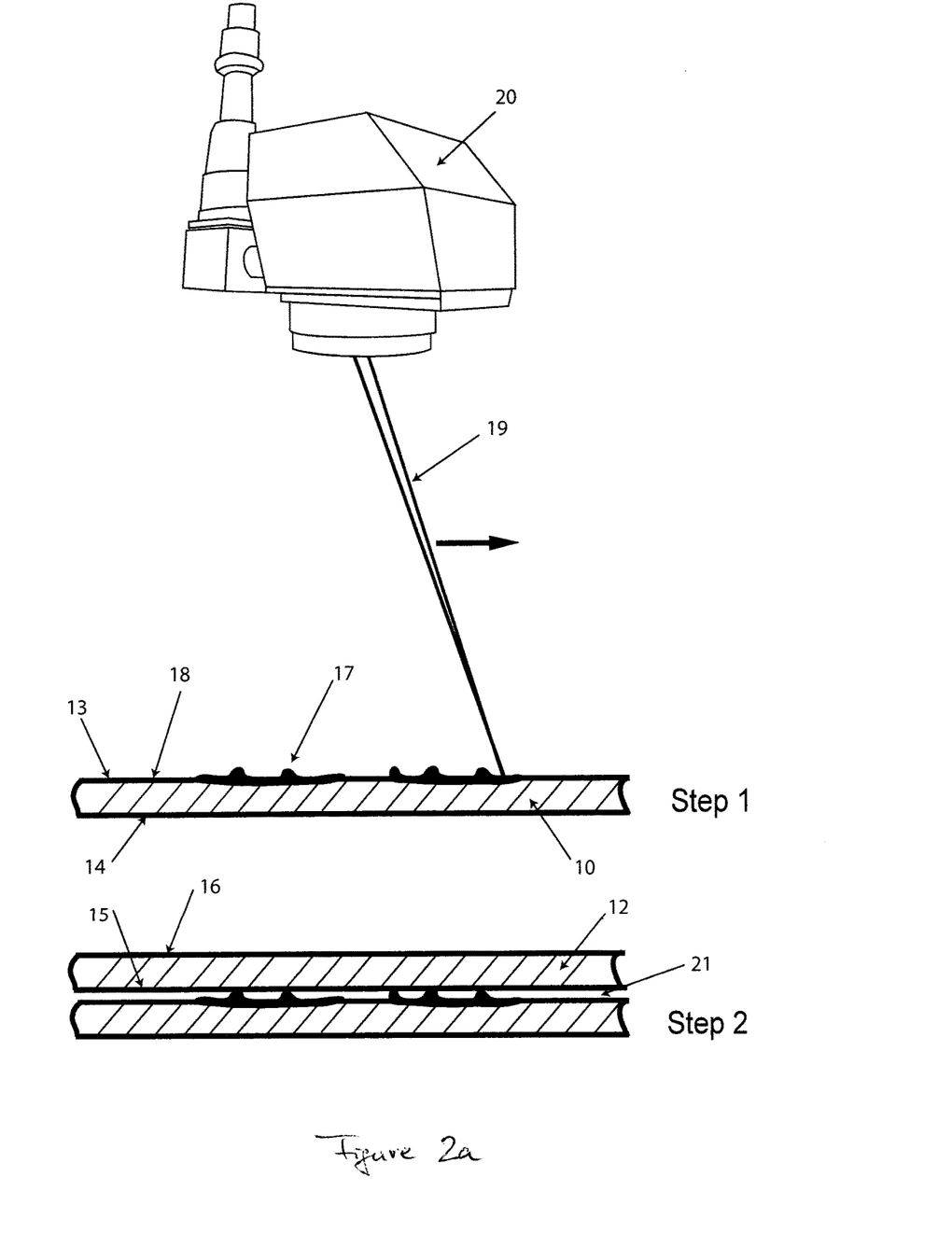
FIGS. 2a and 2b show a schematic representation of the sequential steps in performing a welding process in accordance with the instant invention.

Referring to FIGS. 1 and 2a, a pair of components 10, 12 are connected by a linear weld 11 as indicated by a dashed line. Alternatively, non-linear welds or weld patterns can be applied. Each of the components 10, 12 is a steel sheet having oppositely directed surfaces 13, 14 and 15, 16 respectively. Each of the surfaces has a coating 18 made from a material with a low vaporization temperature, such as for example a zinc coating 18 (see FIG. 2a) to provide protection from corrosion.

As shown in FIG. 2a, one of the components to be welded, namely zinc-coated steel sheet component 10 is placed in a fixture (not shown) which holds the component firmly in place. A laser beam 19 from a remote welding head 20 scans the top surface 13 of the sheet 10 in a few sections to generate a series of protuberances 17 near or at the area of the intended welding line or welding pattern 11 at a speed sufficient to generate protuberances 17 by means of the humping effect. This first pre-processing step can be done in a fraction of a second using the remote welding/scan head 20.

In the pre-process, the laser beam of sufficient high energy intensity scans over the joining area at an extremely high speed. The laser beam only requires the firing of a series of short segments. Along the beam path, a series of humps or droplets are generated when the humping effect is taking place. These protuberances above the surface serve as a natural spacer. When this pre-processed sheet is stacked together with another sheet, a gap is formed by means of these protuberances. In accordance with an embodiment of the instant invention, the gap is localized near or at a predetermined welding location. In the welding process, the laser beam can weld over these protuberances or in the nearby area. The gap formed in this way can provide an adequate venting channel for zinc vapour so as to avoid weld defects and to provide good quality welds.

Once these protuberances or humps are formed, the zinc coated steel sheet component 12 is placed on top of the laser pre-processed component 10 as shown in step 2 in FIG. 2a, so that the surface 15 overlies the surface 13. The sheet components 10, 12 are then held in place by a fixture device, such as a clamping system, which is not shown here. As a result, these two sheet components to be welded are held together and are ready to be welded.

The protuberances or humps 17 form an air gap 21 between opposed surfaces 13, 15 of overlapping portions of the zinc-coated steel sheet components 10, 12 at the location to be welded.

Figure 2B:
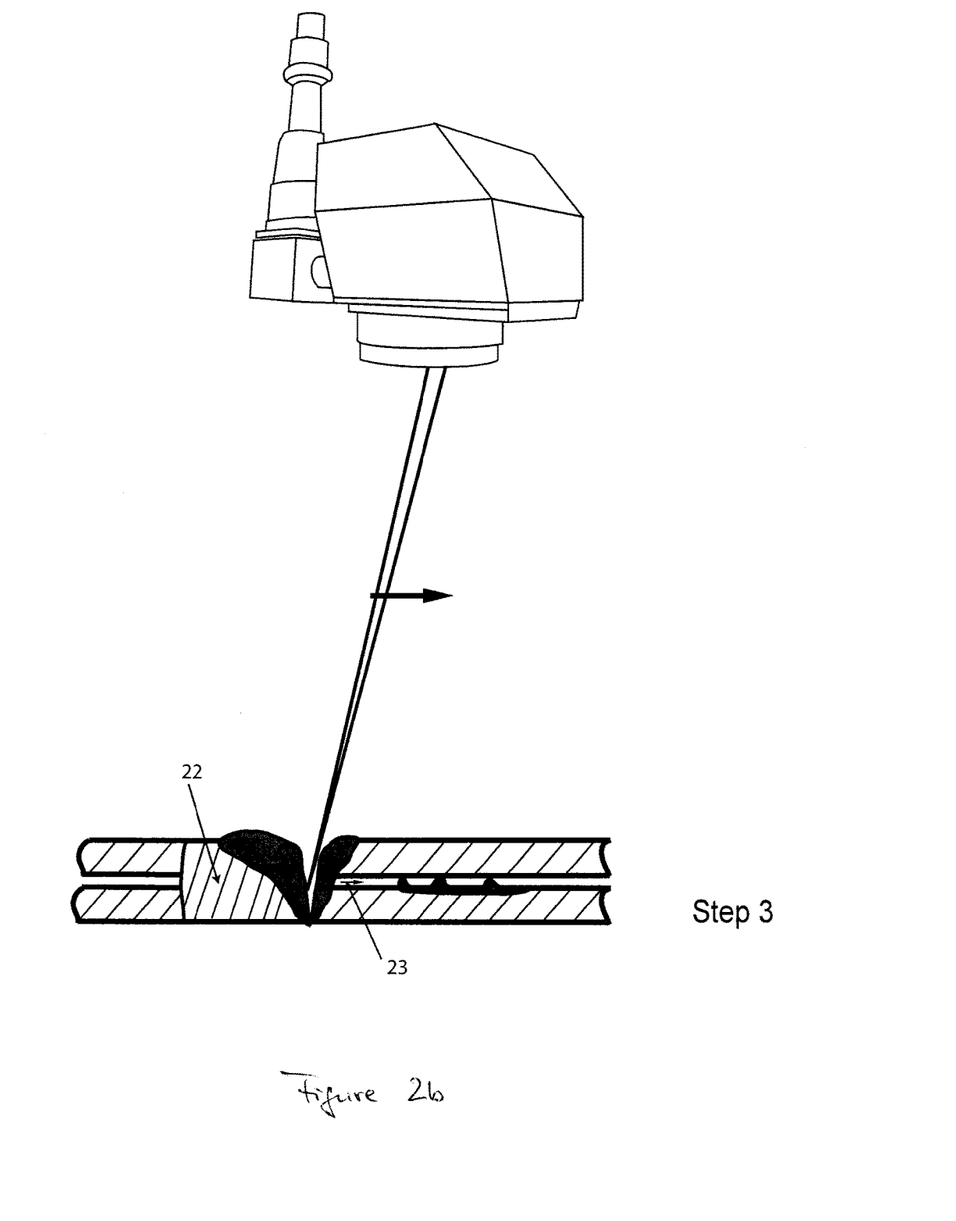

The welding operation can be carried out by applying a laser beam 19 to the steel sheet components 10, 12 as indicated in FIG. 2b by arrow A. During welding, the zinc vapour 23 released from the zinc coating can flow into air gap 21 surrounding the welding keyhole. Therefore, the formation of blow holes or weld porosity is substantially reduced in the solidified metal weld 22. Thus, the resulting weld is satisfactory in quality.

Figure 3:
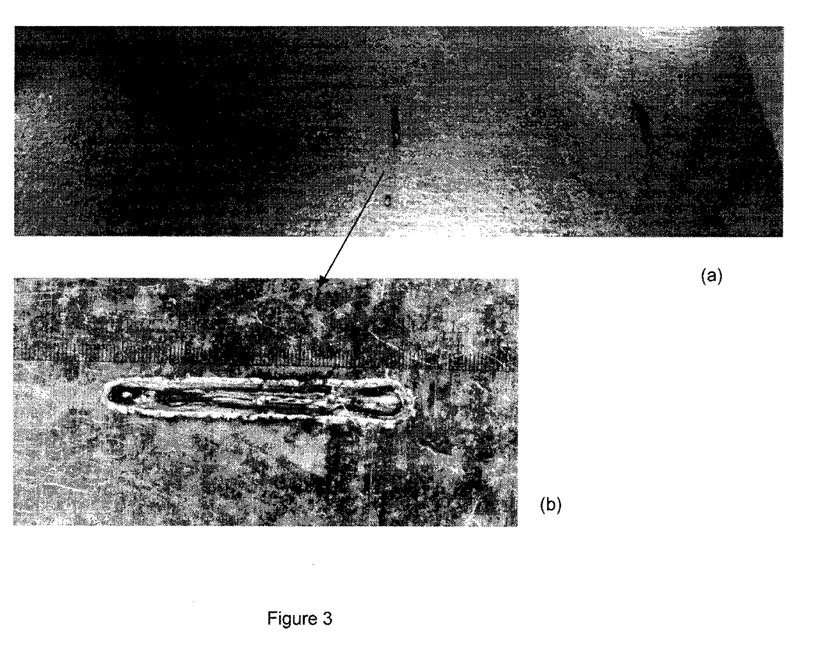
FIGS. 3a and 3b are photographic representations of a portion of one of the sheets shown in FIGS. 2a and 2b showing the generation of humps by means of the humping effect.
Figure 4:
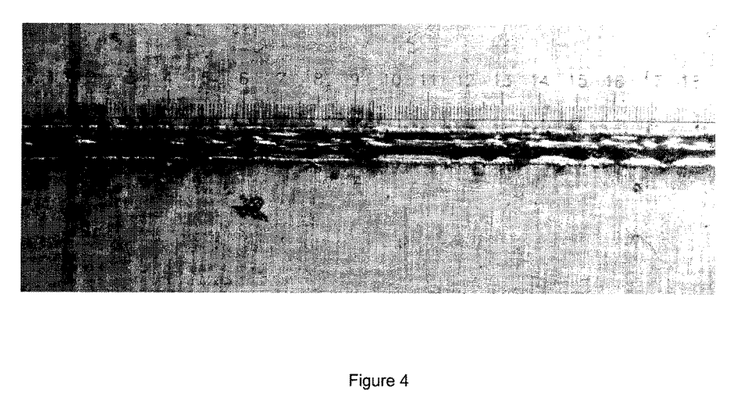
FIG. 4 shows a photographic representation of the high-speed humping effect shown in FIG. 3.

FIGS. 3a and 3b show the pattern of a laser generated high-speed humping effect which is used to perform lap welding of the sample materials. Typical humps generated by a laser beam by means of the humping effect are shown in FIG. 4, which consist of a series of humps in a segment.

The air gap size for producing good quality welds is between 0.1 to 0.2 mm for most of the applications. But the desired or ideal width of the gap depends on the material thickness, coating thickness and type, and possible clamping force. By utilizing the high-speed humping effect, the height of the generated protuberances can be controlled by means of changing the scan speed of the laser beam.

Figure 5:
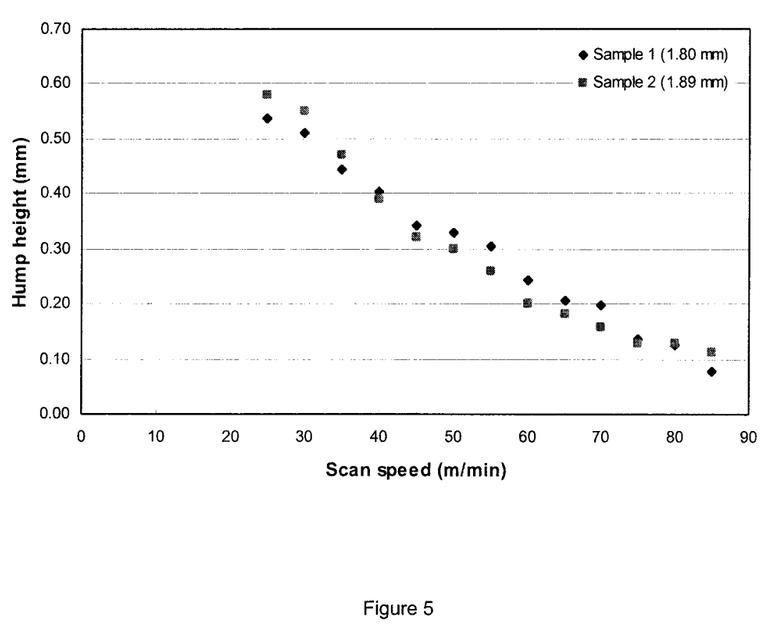
FIG. 5 shows a graphic representation of the hump height vs. scan speed at a fixed laser beam power demonstrating the effect of scan speed on hump height.

As shown in FIG. 5, the measured height of the humps can be varied from 0.1 to 0.5 mm when the scan speed is in the range from 25 to 80 m/min. These humps are generated by a laser beam of 4 kW in power. Generally, a laser power of 0.5 kW and higher is considered a high power laser.

As described in the linear seam welding embodiment above, the zinc vapour 23 escapes into air gap 21 around the humps and can thus be vented from the space between the joint sheets. It is noted that the above description discloses a linear weld pattern. However, in accordance with the instant invention any shape of weld can be performed near or at the location where the humps are generated.

The laser welding step of the first and second components can be performed by scanning the laser beams in a region in which the surfaces of the first and second component are separated by the protuberances. The location of the protuberances does not have to be exactly at the welding location as long as an adequate gap size exists at the welding location to provide an adequate venting channel. Furthermore, a pattern created by the protuberances can be different from the welding pattern as long as an adequate gap size exists at the welding location to provide an adequate venting channel.

In accordance with the invention, the creation of a spacer utilizing the humping effect is extremely fast, simple and very flexible as a laser beam from a scanning head can scan any location on the sheet component within its reachable range to create protuberances and to perform the actual welding in a second step. Moreover, when the scanning welding head is mounted on a robot arm, the remote laser welding can also be applied to components with complicated shapes.

Figure 6:
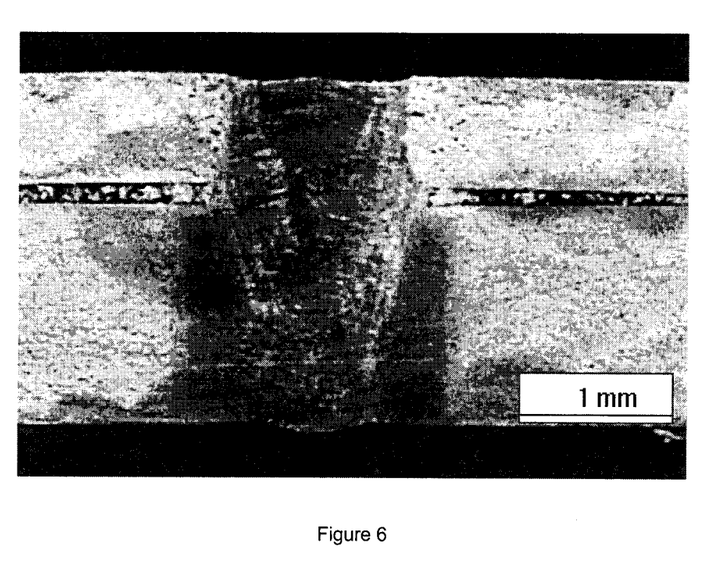
FIG. 6 shows a photographic representation of a section of the weld shown in FIG. 1.
Figure 7:
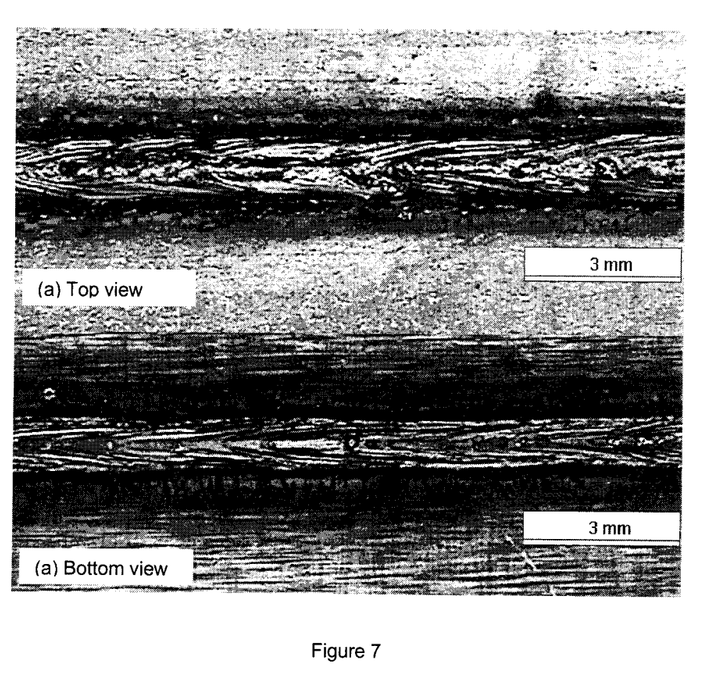
FIG. 7 shows a photographic representation of a plan view of the weld shown in FIG. 1.

FIGS. 6 and 7 show a lap weld produced using the process of the instant invention, wherein FIG. 6 shows a photographic representation of a section of the weld shown in FIG. 1, and FIG. 7 shows a photographic representation of a plan view of the weld shown in FIG. 1.

Having regard to FIG. 5, the laser power is fixed at 4 kW and the beam is focused on the top surface of the component. As can be seen, the humping effect takes place at a speed of about 20 m/min. At the initiation of the humping effect, the height of the humps is relatively high, i.e. it can be over 0.5 mm. With an increase in scan speed, the hump height is decreasing. At an extreme high speed, the droplets disappear along the weld bead. This speed limit is laser specific. With the laser used in generating FIG. 5, the humping effect is barely seen when the speed is above 80 m/min.

When the laser beam power is reduced to 3.5 kW, the humping effect occurs at a speed of 30 m/min for this laser. This experimental data verifies that the welding speed for initialization of the humping effect decreases with increasing laser power. When the laser power is decreased further to 3 kW, the humping effect barely happens. With the full laser power of 4 kW, only a slight humping takes place at the welding speed of 30 m/min if the laser beam is defocused at 5 mm. Therefore, a higher power laser beam gives a better controllability of the humping effect.

Figure 8:
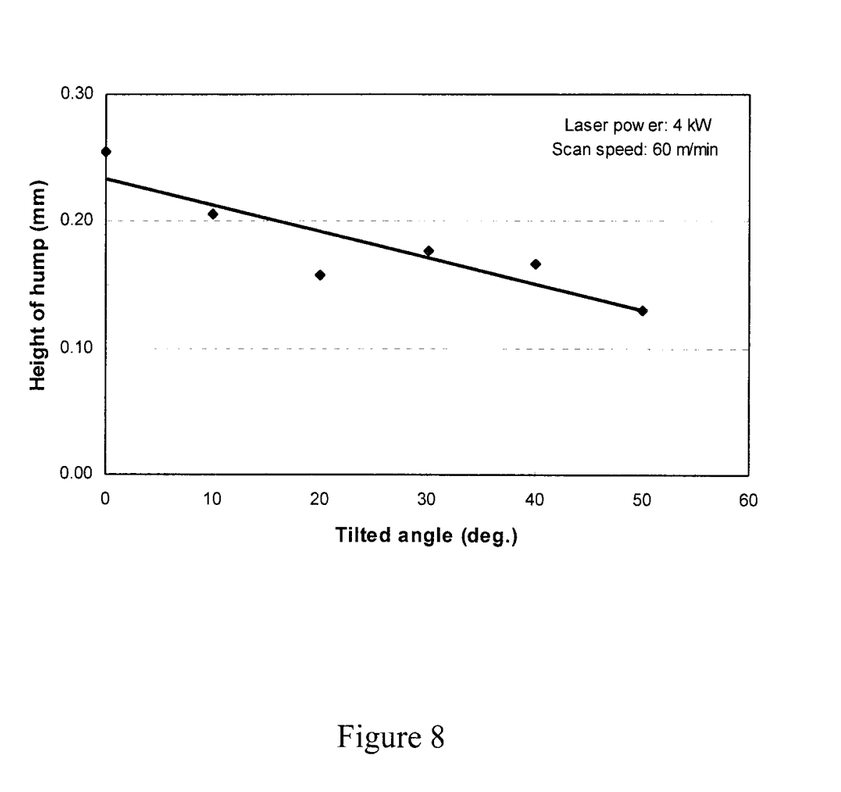
FIG. 8 shows a graphic representation of the height of the humps for a plurality of incident laser beam angles.

In remote laser beam welding, the incident beam is not always perpendicular to the material surface. For this reason, the effect of the incident angle of the laser beam on the generation of the humping effect is investigated. FIG. 8 shows a graphic representation of the height of the humps for a plurality of incident laser beam angles. The humps near perpendicular condition are slightly higher than those generated at relatively larger angles. As can be seen from FIG. 8, at a tilted angle of up to 50 degrees, the laser beam still produces proper humps for laser lap welding.

Figure 9:
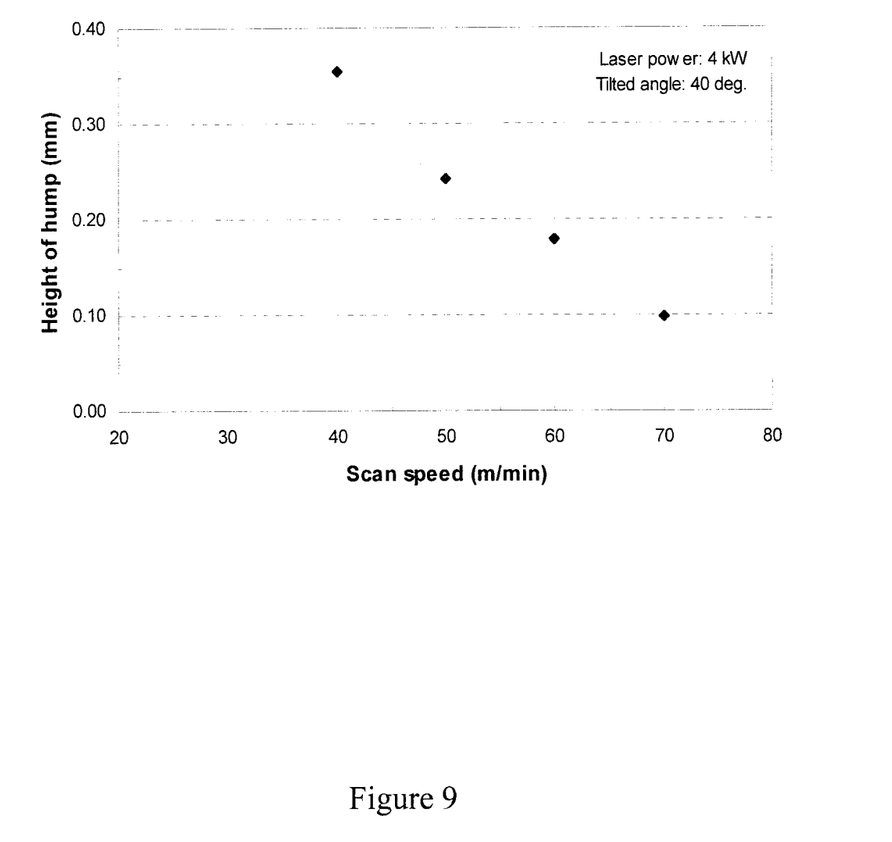
FIG. 9 shows a graphic representation of the dependence of the hump height on the scanning speed when the tilted angle of the laser beam is at 40 degrees.

FIG. 9 shows a graphic representation of the dependence of the hump height on the scanning speed when the tilted angle of the laser beam is at 40 degrees. The laser power to generate these humps is at 4 kW. It can be seen from FIG. 9 that the scan speed of the laser beam is the main controlling factor to generate humps with the desired height.

In accordance with the examples presented above, to make good quality lap welds, a gap of 0.1-0.2 mm in size is required between the components to be welded. As can be seen from FIGS. 5, 8, and 9, a laser beam at a power of 4 kW is capable of producing an adequate gap for a good quality lap weld with a scan speed in the range from 60-80 m/min. These results are applicable to a beam spot size of 0.6 mm with a 450 mm focusing length. For other laser sources, the desired processing condition will be slightly different.

Therefore, the humping effect occurs when a scan speed of a laser beam exceeds a certain limit. This limit is depending on the laser power and beam spot size. When the humping effect takes place, the height of the humps varies with the scan speed. For the example described above, humps with a height of 0.1-0.2 mm can be generated in a scan speed range from 60 to 80 m/min.

The humping effect can be used advantageously in a pre-process to generate a desired gap for laser beam lap welding of sheet metals coated with a material having a low vaporization temperature. The gap size is controllable by varying the scan speed. The preferred humping effect can also be produced when the laser beam incident angle varies from 0 to 50 degrees. The combination of pre-process and lap welding process is well suitable for remote laser beam welding in which high speed scanning is easily achieved.

Since the pre-process is performed at a high speed, it only requires a fraction of the welding time to complete the whole pre-process. Hence, remote laser beam lap welding utilizing the humping effect is a practical technology for industrial applications.

Furthermore, it is noted that in the dimpling effect disclosed in PCT Publication WO 99/08829 most of the thickness, i.e. more than about 50% of the sheet thickness is melted in order to generate the dimples. In accordance with the instant invention using the humping effect only a small portion on the surface of the component is melted. Therefore, the process in accordance with the instant invention can be applied to components of any material thickness. Moreover, in the dimpling effect disclosed in PCT Publication WO 99/08829 the height of the protuberances is not controllable. As disclosed heretofore, in accordance with the instant invention, the height of the protuberances is controllable by controlling the scanning speed of the laser beam.

It should be appreciated that the foregoing description is illustrative in nature and that the present invention includes modifications, changes, and equivalents thereof, without departure from the scope of the invention.

What is claimed is:

1. A method for laser welding first and second components, comprising:
    using a remote welding head that is in communication with a laser source, moving a laser beam across a portion of a surface of the first component at a scan speed sufficient to generate a series of protuberances along a laser-produced bead on the surface of the first component by means of a humping effect, wherein the laser beam does not melt an entire thickness of the first component along the laser-produced bead;
    juxtaposing said first and second components such that opposed surfaces of the first and second components are separated by protuberances of said series of protuberances on the surface of the first component; and
    laser welding said first and second components by scanning the laser beam, from the remote welding head and the laser source, in a region in which said surfaces are separated by said protuberances;
    controlling a height of the protuberances by controlling the scan speed of the laser beam; and
    wherein the scan speed is from 25 to 80 m/min.

2. The method as defined in claim 1 wherein the first and second components are made from metal or metal alloy and wherein at least one of the first and second components is coated with a material having a vaporizing temperature that is lower than a melting point of the metal or metal alloy.

3. The method as defined in claim 2 wherein the first and second components are made from steel.

4. The method as defined in claim 2 wherein the first and second components are coated with at least one of zinc, zinc oxide, magnesium, and magnesium oxide.

5. The method as defined in claim 1 wherein the series of protuberances create a pattern corresponding to a welding pattern generated by the laser welding step.

6. The method as defined in claim 1 wherein the series of protuberances create a pattern different from a welding pattern generated by the laser welding step.

7. The method as defined in claim 1 further comprising clamping the first and second components to each other prior to the step of laser welding.

8. The method as defined in claim 1 further comprising controlling a height of the protuberances by controlling an intensity of the laser beam.

9. The method as defined in claim 8 wherein controlling the intensity of the laser beam includes controlling a laser power and a beam spot size of the laser beam.

10. The method as defined in claim 8 wherein the height of the protuberances is from 0.1 to 0.2 mm.

11. The method as defined in claim 1 wherein the height of the protuberances is from 0.1 to 0.2 mm.

12. The method as defined in claim 1 wherein the scan speed is from 60 to 80 m/min.

13. A method of laser welding first and second components comprising:
    using a remote welding head that is in communication with a laser source, moving a laser beam across a portion of a surface of the first component at a scan speed sufficient to generate a series of protuberances along a laser-produced bead on the surface of the first component by means of a humping effect,
    wherein the movement of the laser beam across the portion of the surface of the first component is at the scan speed of between 25 to 80 m/min;
    wherein the laser beam does not melt an entire thickness of the first component along the laser-produced bead;
    juxtaposing said first and second components such that opposed surfaces of the first and second components are separated by protuberances of said series of protuberances on the surface of the first component;
    laser welding said first and second components by scanning the laser beam, from the remote welding head and the laser source, in a region in which said surfaces are separated by said protuberances; and
    controlling a height of the protuberances by controlling the scan speed of the laser beam.

14. The method as defined in claim 13 wherein the first and second components are made from metal or metal alloy and wherein at least one of the first and second components is coated with a material having a vaporizing temperature that is lower than a melting point of the metal or metal alloy.

15. The method as defined in claim 14 wherein the first and second components are made from steel.

16. The method as defined in claim 14 wherein the first and second components are coated with at least one of zinc, zinc oxide, magnesium, and magnesium oxide.

17. The method as defined in claim 13 further comprising controlling a height of the protuberances by controlling an intensity of the laser beam.

18. The method as defined in claim 17 wherein controlling the intensity of the laser beam includes controlling a laser power and a beam spot size of the laser beam.

* * * * *